(12) United States Patent
Lim et al.

(10) Patent No.: US 10,328,520 B2
(45) Date of Patent: Jun. 25, 2019

(54) APPARATUS AND METHOD FOR TRIMMING A SIDE OF STEEL PLATE

(71) Applicant: POSCO, Pohang-si, Gyeongsangbuk-do (KR)

(72) Inventors: Choong Soo Lim, Pohang-si (KR); Hyeong Jun Huh, Suncheon-si (KR); Sung Joon Kwak, Suncheon-si (KR); Sang Ho Park, Jeonju-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 420 days.

(21) Appl. No.: 15/106,232

(22) PCT Filed: Dec. 26, 2013

(86) PCT No.: PCT/KR2013/012209
§ 371 (c)(1),
(2) Date: Jun. 17, 2016

(87) PCT Pub. No.: WO2015/093675
PCT Pub. Date: Jun. 25, 2015

(65) Prior Publication Data
US 2016/0318121 A1    Nov. 3, 2016

(30) Foreign Application Priority Data

Dec. 18, 2013  (KR) .................. 10-2013-0157873
Dec. 23, 2013  (KR) .................. 10-2013-0161413

(51) Int. Cl.
*B23K 26/00*  (2014.01)
*B23K 26/364* (2014.01)
(Continued)

(52) U.S. Cl.
CPC ...... *B23K 26/0093* (2013.01); *B21B 15/0007* (2013.01); *B23D 19/04* (2013.01);
(Continued)

(58) Field of Classification Search
CPC ........ B23K 26/00; B23K 26/364; B21B 15/00
(Continued)

(56) References Cited

U.S. PATENT DOCUMENTS

| | | | |
|---|---|---|---|
| 4,857,697 A * | 8/1989 | Melville | B23K 26/0613 219/121.63 |
| 2006/0000526 A1 * | 1/2006 | Yoshiyama | B23K 26/0846 148/325 |
| 2012/0028069 A1 | 2/2012 | Sakai et al. | |

FOREIGN PATENT DOCUMENTS

CN   102341511 A    2/2012
CN   203236531 U   10/2013
(Continued)

OTHER PUBLICATIONS

Korean Decision to Refuse a Patent dated Aug. 7, 2015 issued in Korean Patent Application No. 10-2013-0157873.
(Continued)

*Primary Examiner* — Samuel M Heinrich
(74) *Attorney, Agent, or Firm* — Morgan, Lewis & Bockius LLP

(57) ABSTRACT

A side trimming apparatus including a cutting unit which is installed on at least one side of a steel plate being transferred and trims a side of the steel plate by mechanical cutting and a laser processing unit which is installed in front of the cutting unit and emits a laser beam to a portion of the steel plate to be cut to form a groove at the portion to be cut or preheat the portion to be cut, and a side trimming method using the same are provided.

11 Claims, 8 Drawing Sheets

(51) Int. Cl.
*B21B 15/00* (2006.01)
*B23K 26/08* (2014.01)
*B23K 26/361* (2014.01)
*B23K 26/06* (2014.01)
*B23K 26/40* (2014.01)
*B23D 19/04* (2006.01)
*B23D 31/00* (2006.01)
*B23K 103/04* (2006.01)
*B23K 103/00* (2006.01)

(52) U.S. Cl.
CPC .......... *B23D 31/00* (2013.01); *B23K 26/0619* (2015.10); *B23K 26/0846* (2013.01); *B23K 26/361* (2015.10); *B23K 26/364* (2015.10); *B23K 26/40* (2013.01); *B23K 2103/04* (2018.08); *B23K 2103/50* (2018.08)

(58) Field of Classification Search
USPC ............. 219/121.61, 121.62, 121.68–121.72
See application file for complete search history.

(56) References Cited

FOREIGN PATENT DOCUMENTS

| | | |
|---|---|---|
| DE | 102004002504 A1 | 8/2005 |
| JP | S64-087091 A | 3/1989 |
| JP | 2-133281 U | 11/1990 |
| JP | H08-071609 A | 3/1996 |
| JP | 09-108800 A | 4/1997 |
| JP | 10-323791 A | 12/1998 |
| JP | 2000-158162 A | 6/2000 |
| KR | 2010-0107814 A | 10/2010 |
| KR | 2011-0000406 A | 1/2011 |
| KR | 10-2012-0017833 A | 2/2012 |

OTHER PUBLICATIONS

Korean Decision to Refuse a Patent dated Jun. 29, 2015 issued in Korean Patent Application No. 10-2013-0157873.
Korean Office Action dated Nov. 25, 2014 issued in Korean Patent Application No. 10-2013-0157873.
Korean Decision to Refuse a Patent dated Jun. 29, 2015 issued in Korean Patent Application No. 10-2013-0161413.
Korean Decision to Refuse a Patent dated Nov. 5, 2015 issued in Korean Patent Application No. 10-2013-0161413.
Korean Office Action dated Aug. 7, 2015 issued in Korean Patent Application No. 10-2013-0161413.
Korean Office Action dated Dec. 19, 2014 issued in Korean Patent Application No. 10-2013-0161413.
International Search Report dated Sep. 18, 2014 issued in International Patent Application No. PCT/KR2013/012209 (English translation).
Japanese Office Action dated Aug. 4, 2017 issued in Japanese Patent Application No. 2016-541380 (with English translation).
European Office Action dated Aug. 31, 2017 issued in European Patent Application No. 13899855.4.
European Search Report dated Jan. 4, 2017 issued in European Patent Application No. 13899855.4.
Chinese Office Action dated Mar. 2, 2017 issued in Chinese Patent Application No. 201380081751.4 (with English translation).
Chinese Office Action dated Jun. 5, 2018 issued in Chinese Patent Application No. 201380081751.4 (with English translation).

* cited by examiner

APPARATUS AND METHOD FOR TRIMMING A SIDE OF STEEL PLATE

CROSS-REFERENCE TO RELATED APPLICATION

This application is the U.S. National Phase under 35 U.S.C. § 371 of International Patent Application No. PCT/KR2013/012209, filed on Dec. 26, 2013, which in turn claims the benefit and priority from Korean Patent Application Numbers 10-2013-0157873, filed Dec. 18, 2013 and 10-2013-0161413, filed Dec. 23, 2013, the subject matters of which are hereby incorporated by reference.

BACKGROUND

1. Field of the Invention

The present invention relates to an apparatus and a method for trimming a side of a steel plate before a process of rolling and after a process of annealing the steel plate.

2. Discussion of Related Art

A process of trimming a side of a steel plate refers to a process of trimming a side portion of a steel plate before rolling in a continuous cold rolling process for the steel plate and is performed to remove cracks in an edge portion of a hot rolled plate, which cause fractures of a plate during the rolling, and other flaws. Also, a process of trimming a side of a steel plate refers to a process of trimming a side portion of a steel plate to adjust the width of the plate after annealing process.

FIG. 1 illustrates a side trimming apparatus having a typical structure. FIG. 2 illustrates a side-trimming mechanism of a steel plate using the side trimming apparatus of FIG. 1.

As shown in FIG. 1, the side trimming apparatus includes rotating knives 1 and 2 disposed above and below and cut an edge portion of the steel plate. The rotating knives 1 and 2 have a disc shape and are configured to rotate according to the movement of a steel plate S. A horizontal clearance a and a vertical clearance b are formed between the knife 1 located above and the knife 2. Here, the horizontal clearance a means a gap between the rotating knives 1 and 2 in a horizontal direction and the vertical clearance b means a lap where the rotating knives 1 and 2 overlap with each other in a vertical direction.

The steel plate S is cut at the edge portion by a certain amount while sequentially passing through the rotating knives 1 and 2 having the horizontal and vertical clearances a and b. Here, the rotating knives 1 and 2 do not have a self driving force and are rotated by a force due to the movement of a steel plate S.

As shown in FIG. 2, the edge portion of the steel plate S is cut by shearing and tearing by the upper and lower knives 1 and 2. First, the rotating knives 1 and 2 shear the steel plate S by as much as a set amount of the vertical clearance b. Also, due to rotating forces of the rotating knives 1 and 2, cracks C occur at sheared end portions, that is, end portions where the rotating knives 1 and 2 penetrate. As described above, each of the cracks C which occur at the end portions of the rotating knives 1 and 2 grow to meet each other at a center of a cut surface of the steel plate S, and the edge portion is finally cut.

As described above, as a pair of such rotating knives 1 and 2 pressurize to an upper surface and a lower surface of the steel plate S, the side-trimming of the steel plate is performed by a shearing and breaking mechanism. When a steel plate being transferred at a high speed is consecutively sheared using the mechanism, continuous pressures and mechanical impacts are applied to the edge portions of the rotating knives 1 and 2, thereby generating wear and damage. Accordingly, when the rotating knives 1 and 2 are used for a certain period, the rotating knives 1 and 2 may be replaced or may be reused after a polishing operation.

Recently, in a cold rolling process, production of advanced high strength steel (AHSS) is on an upward tendency and AHSS with improved strength is continually being developed. As described above, as the strength of the steel plate increases, necessarily causing wear and damage to the rotating knives 1 and 2. Due to the wear of the rotating knives 1 and 2, flaws such as cracks or burrs may be generated. When the rotating knives 1 and 2 are worn out or damaged, it is necessary to stop a continuous process to replace the rotating knives 1 and 2, thereby lowering production speed.

To overcome the wear and damages of the rotating knives 1 and 2 described above, currently, side trimming is performed while lowering a transfer speed of the steel plate. However, since the whole production speed in the continuous process is lowered, the reduction of the transfer speed cannot be a fundamental solution. In addition, in the case of AHSS having strength at a certain level or more, the rotating knives 1 and 2 are too easily damaged to perform side trimming.

Additionally, even though the strength of the rotating knives 1 and 2 has been increased by changing material as another solution to prevent the rotating knives 1 and 2 from being damaged, trimming AHSS being transferred at high speed remains limited.

SUMMARY OF THE INVENTION

The present invention is directed to providing an apparatus and a method capable of trimming a side of advanced high strength steel (AHSS) at high speed.

Additional aspects will be set forth in part in the description which follows and, in part, will be apparent from the description, or may be learned by practice of the presented embodiments.

One aspect of the present invention provides a side trimming apparatus including a cutting unit which is installed on at least one side of a steel plate being transferred and trims a side of the steel plate through mechanical cutting and a laser processing unit which is installed in front of the cutting unit and emits a laser beam to a portion of the steel plate to be cut to form a groove at the portion to be cut or preheat the portion to be cut.

The cutting unit may include a stand, an upper rotatable knife installed at the stand and disposed above the steel plate, and a lower rotatable knife installed at the stand and disposed below the steel plate to apply a shearing force to the side of the steel plate together with the upper knife.

The laser processing unit may include a laser oscillator which generates a laser beam and an optical condensing head which is installed at the stand and focuses the laser beam of the laser oscillator on the steel plate.

The optical condensing head may be installed at the stand to be rotatably driven to adjust an emission position of the laser beam.

A plurality of such optical condensing heads may be provided above and below the steel plate respectively to emit laser beams to upper and lower surfaces of the steel plate.

The side trimming apparatus may further include a gas jet unit which jets an auxiliary gas to a portion of the groove formed by the laser processing unit. Here, the gas jet unit may have a tilt angle from 45° to 80° with respect to a direction perpendicular to the steel plate.

The side trimming apparatus may further include a controller which is connected to the laser processing unit and controls the laser processing unit to adjust a spot shape or size of the laser beam.

The side trimming apparatus may further include a controller which is connected to the laser processing unit and controls a laser output of the laser processing unit. Here, the controller may be configured to control an output of the laser processing unit to maintain a temperature of a cut portion cut by the cutting unit to be within a range from 400° C. to 600° C.

The side trimming apparatus may further include an input portion which is connected to the controller and receives at least one of transfer speed information and steel grade information of the steel plate input from a main controller of a cold rolling line, and the controller may control the output of the laser processing unit based on the input information of the input portion.

Another aspect of the present invention provides a side trimming method including transferring a steel plate, forming a linear groove by emitting a laser beam to a portion of the steel plate to be side-trimmed, and trimming a side of the steel plate by mechanically cutting a portion where the groove is formed.

The method may further include jetting an inert gas to the portion of the groove of the steel plate when the groove is formed by emitting the laser beam to the steel plate.

Still another aspect of the present invention provides a side trimming method including transferring a steel plate, preheating a portion of the steel plate to be side-trimmed by emitting a laser beam to the portion to be side-trimmed, and trimming a side of the steel plate by mechanically cutting the preheated portion.

When the laser beam is emitted, a spot shape of the laser beam may be controlled for a spot of the laser beam to have a circular shape.

When the laser beam is emitted, a spot shape of the laser beam may be controlled for a spot of the laser beam to have a linear or oval shape with a transfer direction of the steel plate as a longitudinal direction thereof.

The preheating of the steel plate may be performed to maintain a temperature of a cut portion of the steel plate to be within a range from 400° C. to 600° C.

The emitting of the laser beam may include receiving at least one of transfer speed information and steel grade information of the steel plate input from a main controller of a cold rolling line and controlling an output of the laser beam based on the input information.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, an apparatus and a method for trimming a side of a steel plate according to embodiments of the present invention will be described in detail with reference to the attached drawings.

Figure 3:
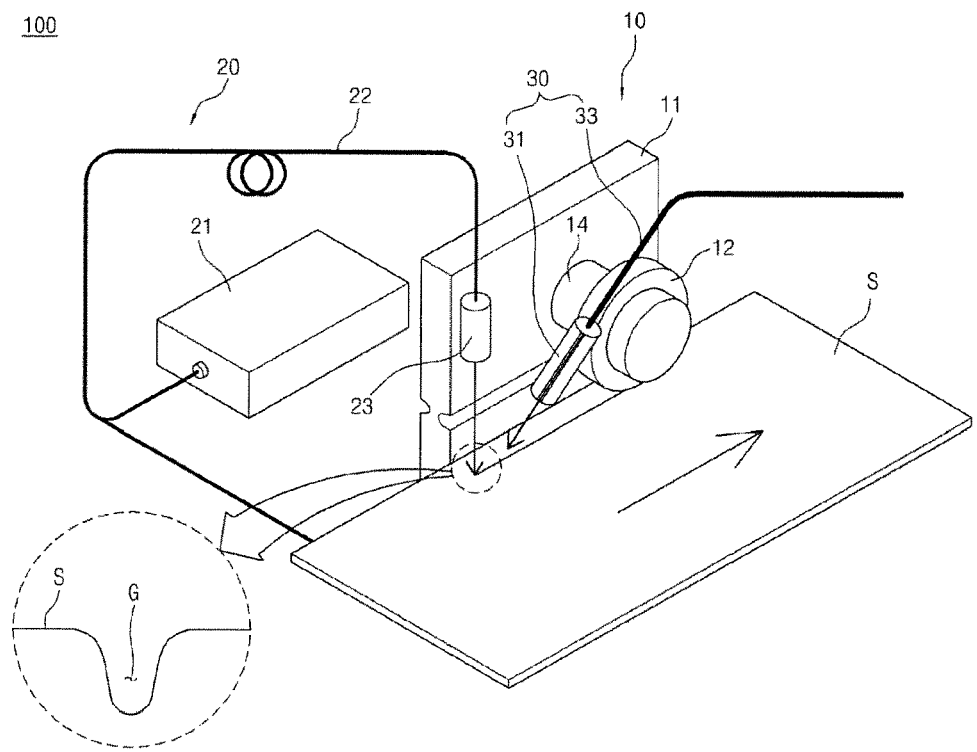
FIG. 3 is a perspective view of a side trimming apparatus according to an embodiment of the present invention.
Figure 4:
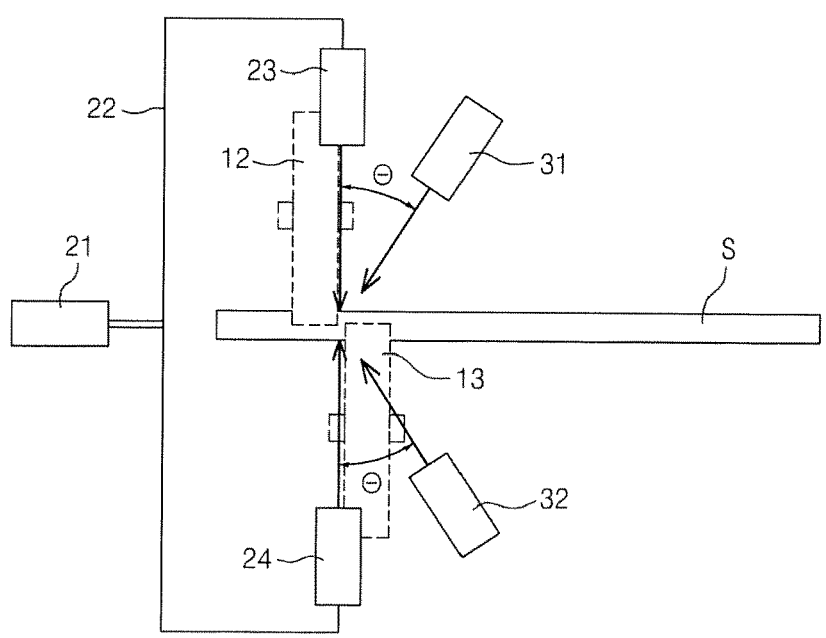
FIG. 4 is a front view of the side trimming apparatus shown in FIG. 3.

FIG. 3 is a perspective view of a side trimming apparatus according to an embodiment of the present invention. FIG. 4 is a front view of the side trimming apparatus shown in FIG. 3.

A cutting unit 10 is installed at one side of a steel plate S being transferred and has a configuration for trimming a side portion of the steel plate S by mechanical cutting. The cutting unit 10 includes a stand 11, an upper knife 12, and a lower knife 13.

The stand 11 is installed on a side of the steel plate S and rotatably supports the upper and lower knives 12 and 13.

The upper knife 12 is rotatably installed at the stand 11 and disposed above the steel plate S. The lower knife 13 is rotatably installed at the stand 11 and disposed below the steel plate S to apply a shearing force to the side portion of the steel plate S together with the upper knife 12.

Figure 1:
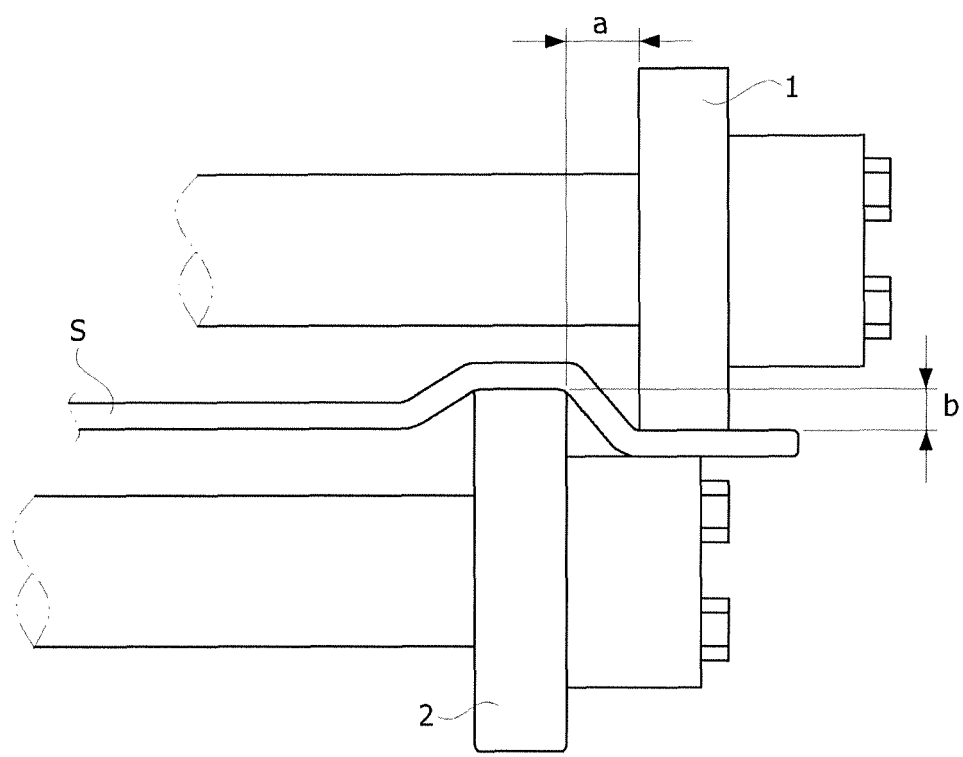
FIG. 1 is a front view of a side trimming apparatus having a typical structure.
Figure 2:
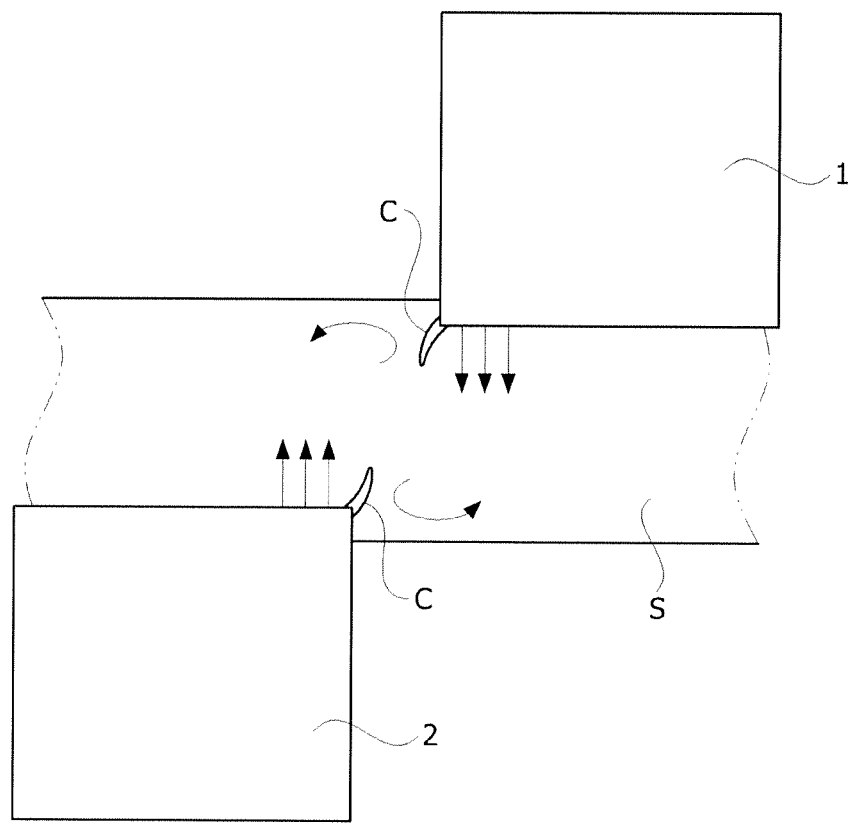
FIG. 2 is a concept of a side-trimming mechanism of a steel plate using the side trimming apparatus of FIG. 1.

The upper and lower knives 12 and 13 have a disc shape and are rotatably connected to the stand 11 by a rotation shaft 14. The upper knife 12 and the lower knife 13 are disposed to form a horizontal clearance a (refer to FIG. 1) and a vertical clearance b (refer to FIG. 1) with certain intervening distances. Here, the horizontal clearance a means a gap between the upper and lower knives 12 and 13 in a horizontal direction and the vertical clearance b means a lap where the upper and lower knives 12 and 13 overlap with each other in the vertical direction.

The upper and lower knives 12 and 13 do not have their own driving forces and are rotated by a movement force of the steel plate S. The steel plate S are sheared and torn at a side portion while sequentially passing between the upper and lower knives 12 and 13.

A laser processing unit 20 forms a groove with a certain depth in the steel plate S in advance by emitting a laser beam, thereby reducing a load on the cutting unit 10, more particularly, the knives 12 and 13 during cutting of the side of the steel plate S by the cutting unit 10.

The laser processing unit 20 includes a laser oscillator 21 and optical condensing heads 23 and 24.

The laser oscillator 21 generates and oscillates laser light. As the laser oscillator 21, various types of laser oscillators including a continuous wave (CW) laser oscillator, a pulse laser oscillator, etc. may be used. Laser light may be generated using various media such as gases, solids, fiber lasers, etc. However, since absorption rates of laser light with a short wavelengths into the steel plate S are high, lasers of short wavelengths may advantageously be used to process advanced high strength steel (AHSS), that is, to process a groove in the steel plate S or to preheat the steel plate S.

The optical condensing heads 23 and 24 concentrate laser beams L of the laser oscillator 21 on the steel plate S. The optical condensing heads 23 and 24 each include an optical system formed of one or more lenses and are connected to the laser oscillator 21 through an optical transmission unit such as an optical fiber 22, etc.

The optical condensing heads 23 and 24 may be provided above and below the steel plate S to emit the laser beams L on upper and lower surfaces of the steel plate S. The laser beams generated by the laser oscillator 21 are emitted to the upper and lower surfaces of the steel plate S through the optical fiber 22 and the optical condensing heads 23 and 24. FIG. 3 illustrates an example of using fiber lasers but embodiments are not limited thereto and other lasers may be used as described above.

Like in the embodiment, when laser light is transmitted using the optical fiber 22, a size of a laser beam at an output end of the optical fiber 22 is adequately small in such a way that it is unnecessary to use the optical condensing heads 23 and 24. However, in the embodiment, a laser beam is allowed to have full energy density at a surface of the steel plate S using the optical condensing heads 23 and 24, and a final optical system maintains an adequate distance from the steel plate S not to be damaged by a collision or heat.

As described above, a laser beam may be focused on a very small area at high density using the optical condensing heads 23 and 24 including focusing lenses. When the laser beam focused at high density enters a surface of the steel plate S, a part of optical energy is absorbed by the steel plate S and a temperature of the steel plate S increases due to the absorbed optical energy. Here, when an amount of the absorbed optical energy is adequately large, a portion to which light is emitted is melted. A groove G may be processed in the steel plate S using a melting phenomenon caused by light absorption described above.

The side trimming apparatus for the AHSS may further include a gas jet unit 30. The gas jet unit 30 includes an upper gas jet nozzle 31 and a lower gas jet nozzle 32 which jet auxiliary gases to a portion of the steel plate to which a laser beam is emitted to form a groove and discharge the melt outward.

Each of the gas jet nozzles 31 and 32 is connected to a gas storage (not shown) by an interposing gas supply line 33 and is installed to be at a certain angle θ with a vertical direction of the surface of the steel plate S. With the angle θ being greater with respect to the vertical direction of the surface of the steel plate S, discharging of the melt becomes easier. Accordingly, the angle θ of the gas jet nozzles may be, for example, from 45° to 80°.

Also, the auxiliary gases used by the gas jet nozzles 31 and 32 may be formed of inert gases which do not chemically react with the steel plate S. For example, air, N2, CO2, Ar, etc. may be used.

A side-trimming process of the AHSS using the side trimming apparatus configured as described above will be described as follows.

As shown in FIG. 3, the laser beam transmitted close to the steel plate S is emitted to the surface of the steel plate S by the optical condensing heads 23 and 24 including focusing lenses.

Since the laser beam is emitted at high density from the optical condensing heads 23 and 24 to the surface of the steel plate S in front of the upper and lower knives 12 and 13 and the steel plate S is transferred at a certain speed, the groove G is formed linearly in the longitudinal direction of the steel plate S.

That is, the laser beam focused at adequately high density by the optical condensing heads 23 and 24 is emitted to specific spots of the upper surface and the lower surface of the steel plate S, and the spots of the steel plate S to which the laser beam is emitted are melted. Here, the auxiliary gases are injected by the gas jet unit 30 installed at the certain angle θ with the vertical direction of the surface of the steel plate S and remove the melt outward from the steel plate S. As needed, laser-beam-emitted positions of the upper surface and the lower surface of the steel plate S and the angle θ of the gas jet nozzles 31 and 32 may be configured to be suitably controlled.

As described above, when gas pressure is applied to the melt, the melt is removed, thereby forming the groove G. A width W and a depth D of the groove G may be adjusted by adjusting the size of a spot and energy density of the laser beam emitted to the steel plate S and an incidence angle θ of the auxiliary gases and may be controlled to minimize a shear load on the rotating knives 12 and 13.

After that, according to continuous transferring of the steel plate S, the linear groove G formed in the steel plate S is transferred to the cutting positions of the upper and lower knives 12 and 13, and a portion of the steel plate S where the groove G is formed is easily cut by rotations of the upper knife 12 and the lower knife 13.

As described above, in the embodiment, the laser beam is focused at a cutting portion of the steel plate S by the rotating knives 12 and 13 to form the groove G, thereby reducing the shear load on the knives 12 and 13 to make trimming the AHSS at high speed possible.

That is, since it is possible to focus a laser beam to be an adjustable spot using a photorefractive device such as a lens, when a laser beam transmitted using a uniform method is emitted to a steel plate using a photorefractive device, a surface of the steel plate is locally heated due to absorption of the laser beam, and a local melting phenomenon is accompanied with adequate laser energy.

At this point, when gas pressure is applied from a side of local melt, it is possible to remove the melt, thereby forming a groove.

When side-trimming is performed at a high speed on a Pre-Coated Metal (PCM) line, a laser beam is focused in front of the rotating knives, and gas pressure is applied from the side, the groove G with a certain depth and width may be formed before shearing by the rotating knives. Since a portion of a steel plate where the groove G is formed may be reduced in thickness and cracks may easily occur due to irregular micro portions inside the groove G, the steel plate is easily torn by the rotating knives to be easily cut.

Accordingly, even in the case of the AHSS for which performing high speed side trimming is generally impossible, when the groove G is first formed using a laser, cracks easily occur due to a reduction in a thickness and due to the knives, thereby being able to perform high speed side trimming which was impossible before.

Figure 5:
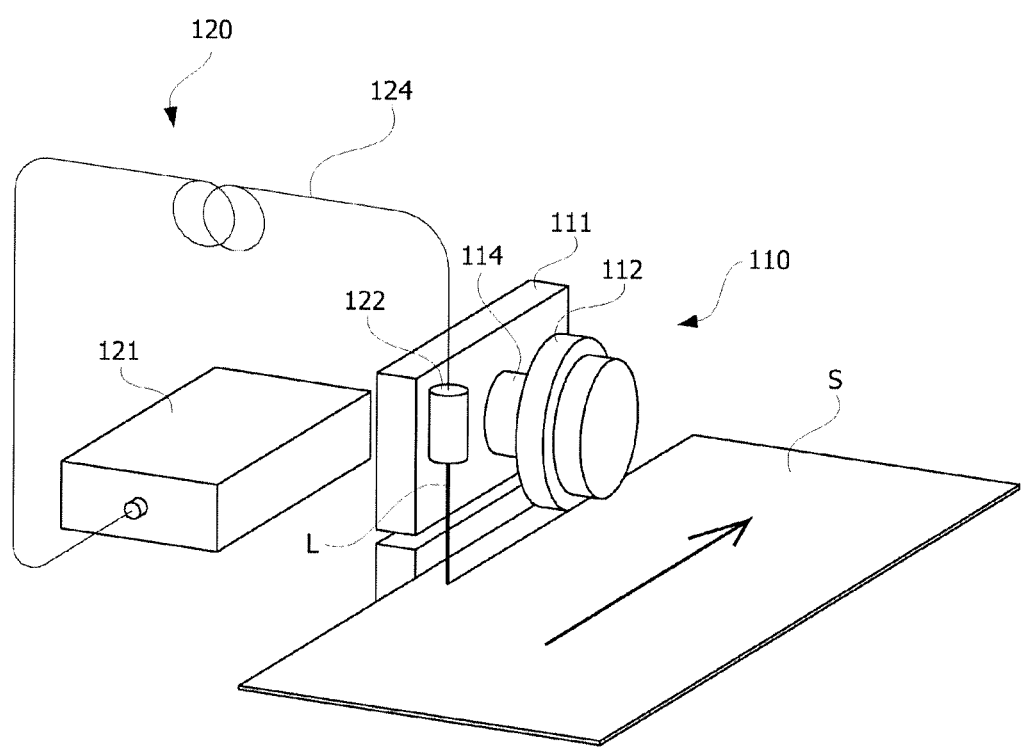
FIG. 5 is a perspective view of a side trimming apparatus according to another embodiment of the present invention.
Figure 6:
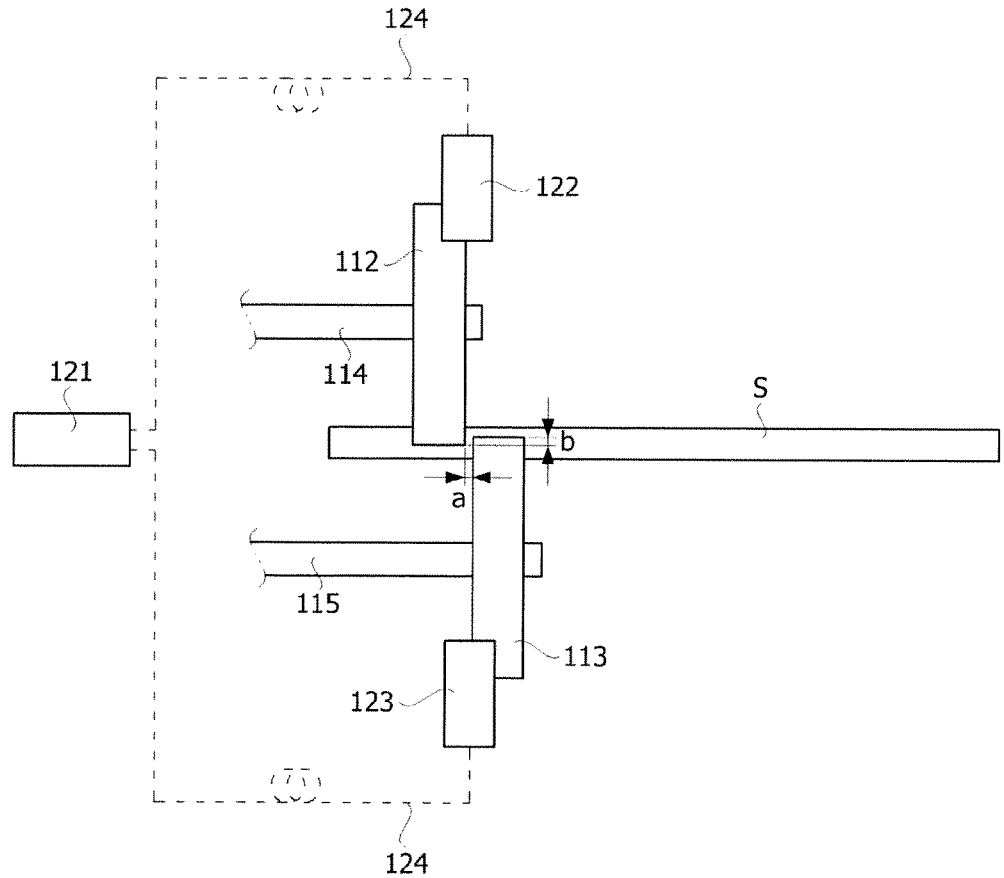
FIG. 6 is a front view of the side trimming apparatus shown in FIG. 5.
Figure 7:
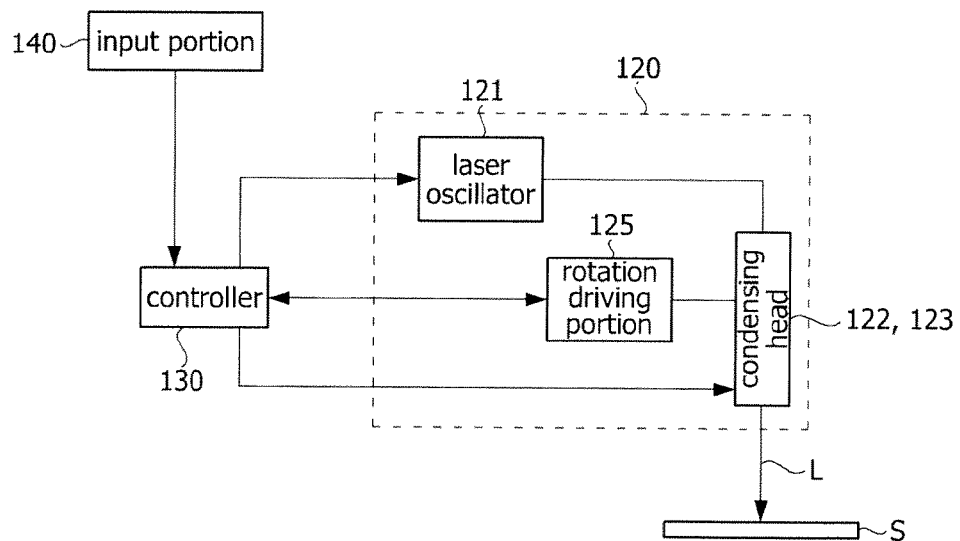
FIG. 7 is a block diagram of the side trimming apparatus shown in FIG. 5.

FIG. 5 is a perspective view of a side trimming apparatus according to another embodiment of the present invention. FIG. 6 is a front view of the side trimming apparatus shown in FIG. 5. FIG. 7 is a block diagram of the side trimming apparatus shown in FIG. 5.

The side trimming apparatus according to the embodiment, like the previous embodiment, includes a cutting unit 110 and a laser processing unit 120.

The cutting unit 110 includes a stand 111, an upper knife 112, and a lower knife 113. The upper and lower knives 112 and 113 are rotatably connected to the stand 111 by rotation shafts 114 and 115, respectively.

The laser processing unit 120 is installed in front of the cutting unit 110 and a laser beam L is emitted to a portion of the steel plate S to be cut to preheat the portion to be cut. The laser processing unit 120 includes a laser oscillator 121 and optical condensing heads 122 and 123. The optical condensing heads 122 and 123 are connected to the laser oscillator 121 by an optical fiber 124.

The side trimming apparatus according to the embodiment is configured to preheat the portion to be cut without forming the groove G (refer to FIG. 3) by the laser processing unit 120, and other descriptions except this are identical to the previous embodiment. Accordingly, since the cutting unit 110 and the laser processing unit 120 have the same configuration as those described in the previous embodiment, a repeated description will be omitted.

According to the embodiment, the optical condensing heads 122 and 123 may be supported by the stand 111. In this case, the optical condensing heads 122 and 123 may be rotatably installed at the stand 111 to adjust positions of emitting a laser beam L. Here, a rotation driving portion 125 including a motor, etc. may be provided between the optical condensing heads 122 and 123 and the stand 111 to drive rotation.

Meanwhile, the laser processing unit 120 may be connected with a controller 130 to control operation of the laser processing unit 120.

The controller 130 may control the laser processing unit 120 to adjust the shape or size of a spot of the laser beam L and, to this end, is configured to control optical systems of the optical condensing heads 122 and 123.

Also, the controller 130 may be configured to control the laser processing unit 120, in particular, a laser output of the laser oscillator 121.

In addition, the side trimming apparatus according to the embodiment may further include an input portion 140 which receives transfer speed information and steel grade information of the steel plate S input from a main controller of a cold rolling line. The controller 130 may be configured to be connected with the input portion 140 and to control the operation of the laser processing unit 120 based on the input information. For example, the controller 130 may be configured to control the output of the laser oscillator 121 based on at least one of the transfer speed information and steel grade information of the steel plate S.

Figure 8:
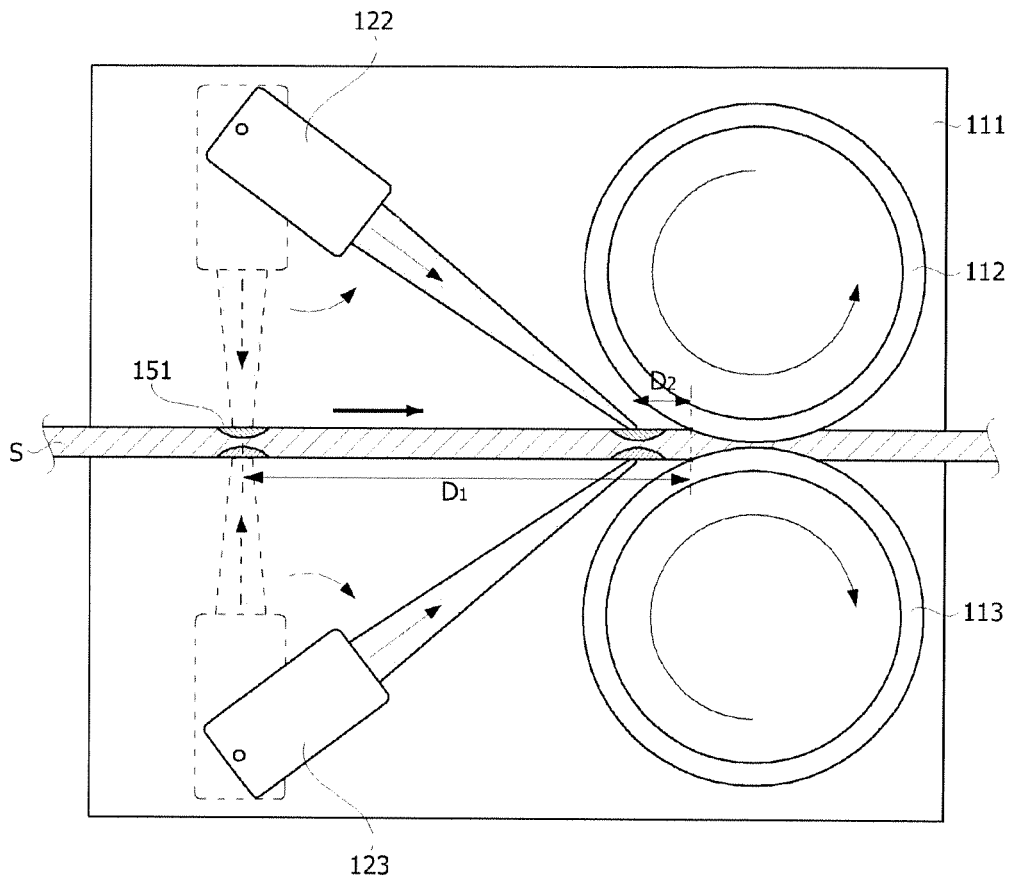
FIGS. 8 and 9 are views illustrating a side trimming method according to an embodiment of the present invention.
Figure 9:
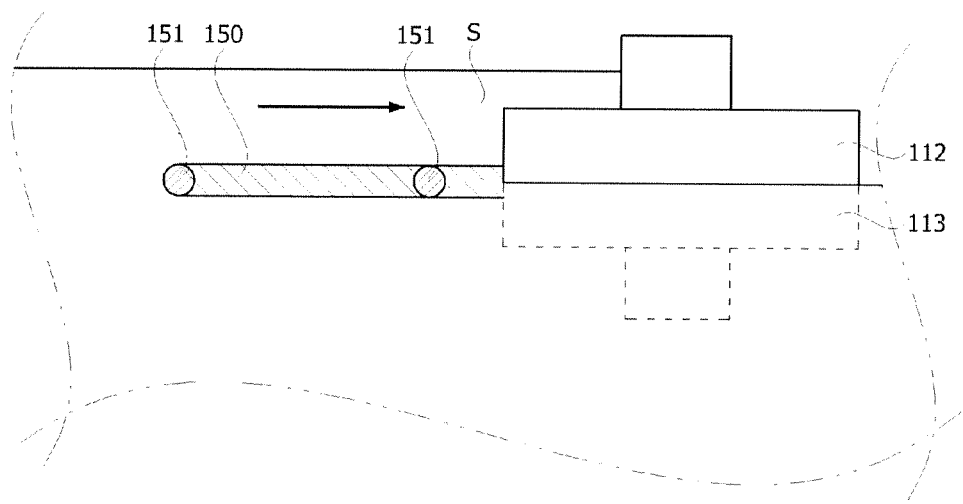

FIGS. 8 and 9 are views illustrating a side trimming method according to an embodiment of the present invention. FIGS. 8 and 9 are a side view and a plan view of a side trimming apparatus applied to the side trimming method according to the embodiment of the present invention.

According to the embodiment, the steel plate S is transferred in a particular direction (in a direction of an arrow shown in FIG. 6) and then the laser beam L is emitted to a portion of the steel plate S to be side-trimmed to preheat the portion to be side-trimmed.

During the preheating of the steel plate S, a spot 151 of the laser beam L may be controlled to allow the spot 151 of the laser beam L to have a circular shape as shown in FIG. 9. Related to this, the controller 130 may control the optical condensing heads 122 and 123 to allow the spot 151 of the laser beam L to have the circular shape.

As described above, the spot 151 of the laser beam L is controlled to be circular, thereby locally heating only the portion of the steel plate S to be cut. Accordingly, the width of a preheated portion may be minimized, and problems caused by a wide preheated area, for example, a change in the strength property, that occurs when a steel plate is cooled may be prevented.

As described above, when the laser beam L is emitted to portions in front of the upper and lower knives 112 and 113 using the laser processing unit 120, since the steel plate S is being transferred at a certain speed, a preheated line 150 is formed in the longitudinal direction of the steel plate S. The preheated line 150 is transferred to the cutting positions of the upper and lower knives 112 and 113.

The upper and lower knives 112 and 113 mechanically cut a preheated portion formed by the laser beam L, that is, the preheated line 150, thereby trimming a side portion of the steel plate S.

As described above, the laser beam L is focused on and preheats the portion of the steel plate S to be cut to locally deteriorate the strength of the preheated portion, thereby reducing the shear load of the upper and lower knives 112 and 113. Accordingly, it is possible to perform high speed trimming of the AHSS.

Meanwhile, an emission position of the laser beam L, an output of the laser beam L, the shape and size of the spot of the laser beam L, etc. may be adjusted using information (the transfer speed and steel grade of the steel plate S) input through the input portion 140 when the laser beam L is emitted to the steel plate S Referring to FIGS. 8 and 9, the emission positions of the laser beam L, that is, distances D1 and D2 from mechanically cut spots to laser emission positions may be adjusted by adjusting rotation angles of the optical condensing heads 122 and 123. Here, rotation angle adjustments of the optical condensing heads 122 and 123 may be performed by controlling a rotation amount of the rotation driving portion 125 by the controller 130.

FIGS. 8 and 9 illustrate that a distance from the mechanically cut spots to the laser emission positions is adjusted from the distance D1 to the distance D2. Since a temperature of the preheated portion is more likely to be cooled as a transfer speed of the steel plate is lower, it is necessary to allow the emission position of the laser beam L to be closer to the cut spot as the transfer speed of the steel plate S is lower.

Also, it may be available to control the temperature of the preheated portion by controlling the output of the laser beam L based on the transfer speed and steel grade of the steel plate S.

Meanwhile, although a method of preheating the steel plate S has been described with reference to FIGS. 8 and 9 as an example of the side trimming method, the described herein may be identically applied to the method of forming the groove G in the steel plate S according to the embodiment related to FIGS. 3 and 4.

Figure 10:
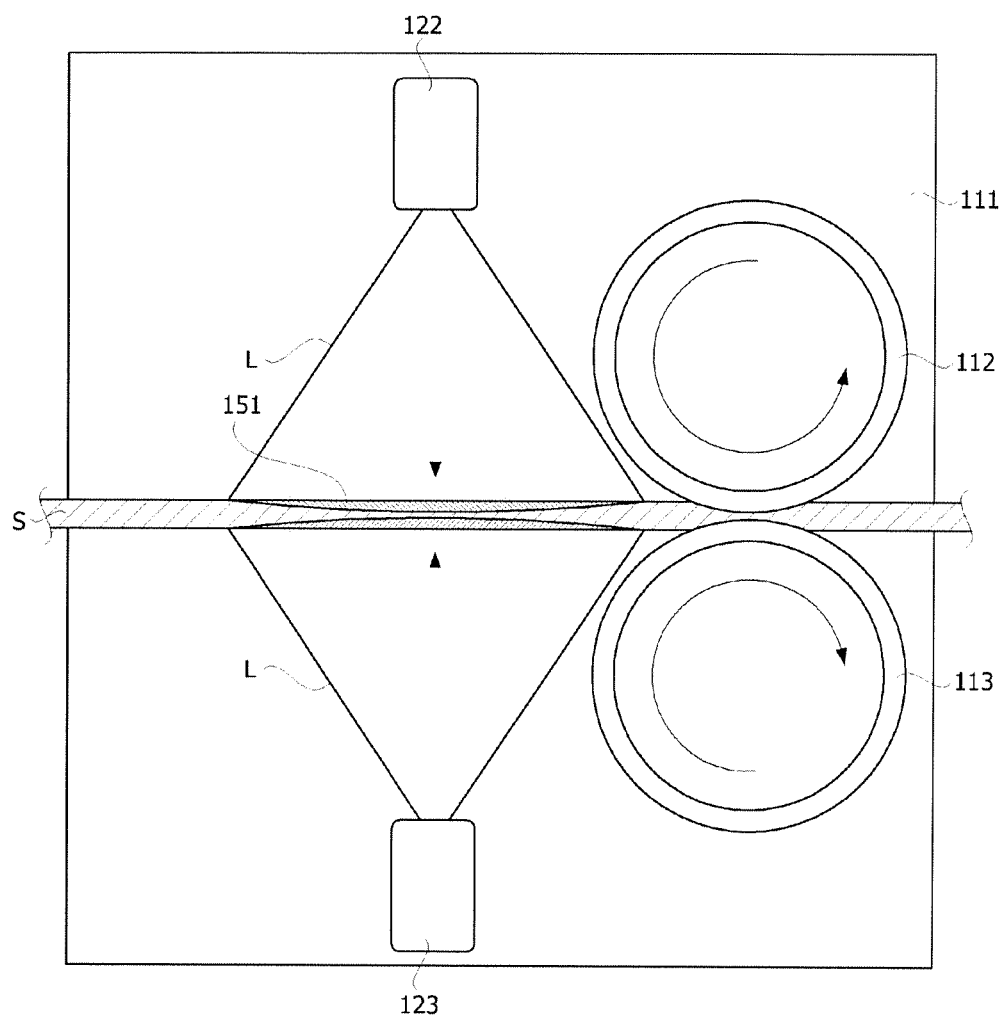
FIGS. 10 and 11 are views illustrating a side trimming method according to another embodiment of the present invention.
Figure 11:
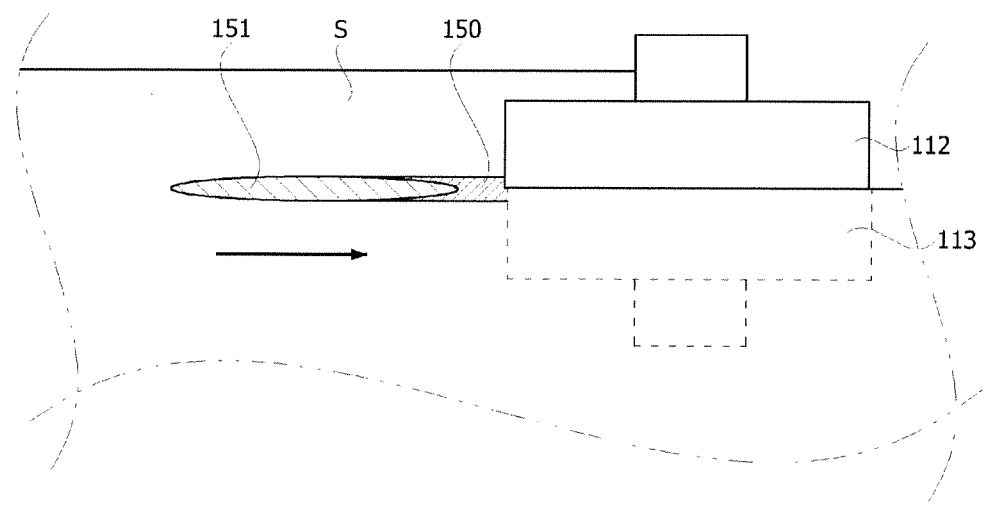

FIGS. 10 and 11 are views illustrating a side trimming method according to another embodiment of the present invention. FIGS. 10 and 11 are a side view and a plan view of a side trimming apparatus applied to the side trimming method according to the embodiment of the present invention.

In the embodiment, there is shown a case of controlling the shape of the spot 151 of the laser beam L to allow the spot 151 of the laser beam L to have an oval shape. Here, the oval is formed to have a transfer direction of the steel plate S as its longitudinal direction. Also, in addition to the oval shape according to the embodiment, the shape of the spot 151 of the laser beam L may be controlled to be in a line shape parallel to the transfer direction of the steel plate S as its longitudinal direction.

The controlling of the shape of the spot 151 of the laser beam L described above may be performed by controlling of the optical systems of the optical condensing heads 122 and 123 by the controller 130.

As described above, a preheated area may be increased by controlling the spot 151 of the laser beam L to be an oval or linear shape, thereby maintaining a temperature of a preheated portion to a position adjacent to a cut portion at a certain temperature or higher.

Figure 12:
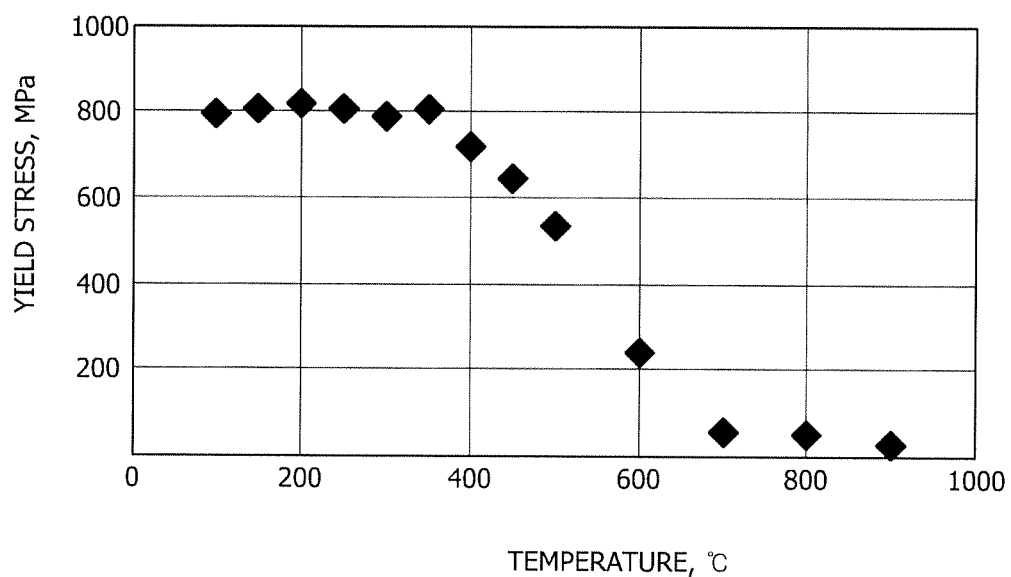
FIG. 12 is a graph illustrating a change in strength of advanced high strength steel according to temperature.

FIG. 12 is a graph illustrating a change in strength according to temperature of the AHSS, measured using a high temperature tensile strength measuring device.

As shown from FIG. 12, it may be known that strength (yield stress) gradually decreases as a temperature of the steel plate S increases to be 400° C. or more. When the temperature of the steel plate S is increased to 600° C., the strength decreases to 25% of strength at room temperature.

That is, in the case of the AHSS described above, a softening temperature range is from 400 to 600° C. It is possible to check that shear loads of the upper and lower knives 112 and 113 are greatly reduced when the AHSS is locally preheated to the softening temperature from 400 to 600° C. using a laser.

Accordingly, the controller 130 is configured to control the output of the laser processing unit 120 to allow the temperature of the cut portion cut by the cutting unit 110 to be within a range from 400 to 600° C.

Here, when the temperature of the cut portion is lower than 400° C., since the yield stress is not reduced, it is impossible to reduce the shear load. When the temperature of the cut portion is higher than 600° C., a change in the material occurs due to a transformation after cooling. Accordingly, the preheating temperature may be within the range from 400 to 600° C.

The side trimming apparatuses and methods for a steel plate described above are not limited to the configurations and method described above. All or some of the embodiments may be selectively combined and configured to perform various modifications. Also, the various modifications may be executed by one of ordinary skill in the art within the technical scope of the present invention.

According to the embodiments of the present invention, a portion to be cut by a rotating knife is formed with a groove or preheated using a laser to locally lower the strength of a steel plate, thereby reducing a shear load on the rotating knife. Through this, it is possible to trim a side of AHSS at a high speed during a continuous cold rolling process.

Also, since it is possible to locally heat a portion of a steel plate to be cut in a circular spot shape or to form a groove at the portion to be cut, a problem which occurs due to a wide preheat area may be prevented.

Also, a shear-load performance may be optimized by adjusting the output of a laser beam, a temperature of a cut portion, a shape and size of a spot, an emission position, etc. depending on a transfer speed, steel grade, etc. of a steel plate.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A side trimming apparatus comprising:
   a cutting unit which is installed on at least one side of a steel plate being transferred and trims a side of the steel plate through mechanical cutting; and
   a laser processing unit which is installed in front of the cutting unit and emits a laser beam to a portion of the steel plate to be cut to form a groove at the portion to be cut or preheat the portion to be cut.

2. The side trimming apparatus of claim 1, wherein the cutting unit comprises:
   a stand;
   an upper rotatable knife installed at the stand and disposed above the steel plate; and
   a lower rotatable knife installed at the stand and disposed below the steel plate to apply a shearing force to the side of the steel plate together with the upper knife.

3. The side trimming apparatus of claim 2, wherein the laser processing unit comprises:
   a laser oscillator which generates a laser beam; and
   an optical condensing head which is installed at the stand and focuses the laser beam of the laser oscillator on the steel plate.

4. The side trimming apparatus of claim 3, wherein the optical condensing head is installed at the stand to be rotatably driven to adjust an emission position of the laser beam.

5. The side trimming apparatus of claim 3, wherein a plurality of such optical condensing heads are provided above and below the steel plate respectively to emit laser beams to upper and lower surfaces of the steel plate.

6. The side trimming apparatus of claim 1, further comprising a gas jet unit which jets an auxiliary gas to a portion of the groove formed by the laser processing unit.

7. The side trimming apparatus of claim 6, wherein the gas jet unit has a tilt angle from 45° to 80° with respect to a direction perpendicular to the steel plate.

8. The side trimming apparatus of claim 1, further comprising a controller which is connected to the laser processing unit and controls the laser processing unit to adjust a spot shape or size of the laser beam.

9. The side trimming apparatus of claim 1, further comprising a controller which is connected to the laser processing unit and controls a laser output of the laser processing unit.

10. The side trimming apparatus of claim 9, wherein the controller controls an output of the laser processing unit to maintain a temperature of a cut portion cut by the cutting unit to be within a range from 400° C. to 600° C.

11. The side trimming apparatus of claim 9, further comprising an input portion which is connected to the controller and receives at least one of transfer speed information and steel grade information of the steel plate input from a main controller of a cold rolling line,
   wherein the controller controls the output of the laser processing unit based on the input information of the input portion.

* * * * *